(12) United States Patent
Roh et al.

(10) Patent No.: US 9,119,198 B2
(45) Date of Patent: *Aug. 25, 2015

(54) METHOD FOR TRANSMITTING CONTROL INFORMATION, AND METHOD FOR GENERATING CODEWORD FOR THE SAME

(71) Applicant: LG ELECTRONICS INC., Seoul (KR)

(72) Inventors: Dong Wook Roh, Anyang-si (KR); Bong Hoe Kim, Anyang-si (KR); Young Woo Yun, Anyang-si (KR); Dong Youn Seo, Anyang-si (KR); Dae Won Lee, Anyang-si (KR); Jung Hoon Lee, Anyang-si (KR); Joon Kui Ahn, Anyang-si (KR); Ki Jun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

This patent is subject to a terminal disclaimer.

(21) Appl. No.: 13/928,316

(22) Filed: Jun. 26, 2013

(65) Prior Publication Data

US 2013/0286981 A1 Oct. 31, 2013

Related U.S. Application Data

(63) Continuation of application No. 12/118,592, filed on May 9, 2008, now Pat. No. 8,498,345.

(60) Provisional application No. 60/917,161, filed on May 10, 2007, provisional application No. 60/943,293, filed on Jun. 11, 2007.

(30) Foreign Application Priority Data

Oct. 25, 2007 (KR) .................. 10-2007-0107595

(51) Int. Cl.
*H04W 72/04* (2009.01)
*H04J 13/12* (2011.01)
(Continued)

(52) U.S. Cl.
CPC ............ *H04W 72/042* (2013.01); *H04J 13/10* (2013.01); *H04L 1/0057* (2013.01); *H04L 1/0067* (2013.01); *H04L 1/0072* (2013.01); *H04J 13/18* (2013.01); *H04L 27/2602* (2013.01)

(58) Field of Classification Search
CPC ... H04L 1/0067; H04L 1/0057; H04L 1/0072; H04J 13/01; H04J 13/10; H04J 13/12; H04J 13/18; H04W 72/02; H04W 72/04; H04W 72/042; H04W 72/0448
See application file for complete search history.

(56) References Cited

U.S. PATENT DOCUMENTS 6,310,869 B1 * 10/2001 Holtzman et al. ............ 370/335
2002/0115464 A1 8/2002 Hwang et al.
(Continued)

FOREIGN PATENT DOCUMENTS

CN 1426247 6/2003
CN 1787507 6/2006
(Continued)

OTHER PUBLICATIONS

Samsung, "Cat0 Transmission Structure", R1-072248, 3GPP TSG RAN WG1 Meeting #49, May 2007, 5 pages.
(Continued)

*Primary Examiner* — Candal Elpenord
(74) *Attorney, Agent, or Firm* — Lee, Hong, Degerman, Kang & Waimey (57) ABSTRACT

A method for transmitting downlink control information and a method for generating a codeword for the same are disclosed. In generating a long code having a low code rate, a basic code of which minimum distance between codes is maximized is repeated by a prescribed number of times and bits of the repeated code are adjusted. Therefore, a minimum distance condition between codes of a long code is satisfied and simultaneously the code be simply generated.

8 Claims, 5 Drawing Sheets

(51) Int. Cl.
*H04J 13/18* (2011.01)
*H04J 13/10* (2011.01)
*H04L 1/00* (2006.01)
*H04L 27/26* (2006.01)

(56) References Cited

U.S. PATENT DOCUMENTS

| | | | |
|---|---|---|---|
| 2003/0063595 | A1 | 4/2003 | You et al. |
| 2003/0108025 | A1 | 6/2003 | Kim et al. |
| 2003/0118083 | A1 | 6/2003 | Li |
| 2003/0118119 | A1 | 6/2003 | Hwang et al. |
| 2004/0219917 | A1 | 11/2004 | Love et al. |
| 2005/0018782 | A1* | 1/2005 | Costa et al. ............... 375/260 |
| 2005/0047518 | A1* | 3/2005 | Auer ............... 375/267 |
| 2005/0130684 | A1* | 6/2005 | Kim et al. ............... 455/464 |
| 2007/0019753 | A1 | 1/2007 | Kim |
| 2007/0189409 | A1* | 8/2007 | Hottinen ............... 375/267 |
| 2007/0268977 | A1 | 11/2007 | Wang et al. |

FOREIGN PATENT DOCUMENTS

| | | |
|---|---|---|
| JP | 05-080646 | 11/2012 |
| RU | 2278474 | 6/2006 |
| WO | 2006/008359 | 1/2006 |
| WO | 2009/008685 | 1/2009 |

OTHER PUBLICATIONS

Ericsson, "Summary of e-mail discussion on downlink control signaling", R1-073051, TSG-RAN WG1 #49bis, Jun. 2007, 2 pages.
Samsung, "Coding for CCFI Transmission", R1-073098, 3GPP TSG RAN WG1 Meeting #49bis, Jun. 2007, 3 pages.
3rd Generation Partnership Project (3GPP); "Technical Specification Group Radio Access Network; Evolved Universal Terrestrial Radio Access (E-UTRA); Multiplexing and channel coding (Release 8)," 3GPP TS 36.212 V1.4.0, Aug. 2007, 28 pages.
NTT DoCoMo, "LTE-Advanced Carrier Aggregation," vol. 18, No. 2, Jul. 2010, 10 pages.
Abbas, et al., "PCFICH Channel Design for LTE using FPGA," IEEE International Conference on Recent Trends in Information Technology, Jun. 2011, 6 pages.
Love et al., "Downlink Control Channel Design for 3GPP LTE," IEEE Proceedings on Wireless Communications and Networking Conference, XP-031243734, Mar. 2008, pp. 813-818.
LG Electronics, "Cat0 Signaling Design," R1-072352, 3GPP RAN WG1 #49, XP-050106081, May 2007, 5 pages.
LG Electronics, "On the Design of PCFICH Coding," R1-072881, 3GPP TSG RAN WG1 #49bis, Jun. 2007, 3 pages.
Ericsson, "Summary of E-mail Discussion on Downlink Control Signaling," R1-073051, TSG-RAN WG1 #49bis, XP-050106709, Jun. 2007, 2 pages.
Sharp, "Improved Flexibility/Performance CQI+ACK/NACK coding in the E-UTRA uplink," 3GPP TSG-RAN WG1 #50, R1-073321, Aug. 2007, 7 pages.
Ericsson, "Coding for ACK/NACK in MIMO operation," TSG-RAN WG1 #46bis, R1-062879, Oct. 2006, 2 pages.

* cited by examiner

(a) Generating matrix $= \begin{bmatrix} 1 & 1 \\ 1 & 0 \\ 0 & 1 \end{bmatrix}$ (b) $\begin{bmatrix} 1 & 1 \\ 1 & 0 \\ 0 & 1 \end{bmatrix} \begin{bmatrix} 0 \\ 0 \end{bmatrix} = \begin{bmatrix} 0 \\ 0 \\ 0 \end{bmatrix}$  $\begin{bmatrix} 1 & 1 \\ 1 & 0 \\ 0 & 1 \end{bmatrix} \begin{bmatrix} 0 \\ 1 \end{bmatrix} = \begin{bmatrix} 1 \\ 0 \\ 1 \end{bmatrix}$ $\begin{bmatrix} 1 & 1 \\ 1 & 0 \\ 0 & 1 \end{bmatrix} \begin{bmatrix} 1 \\ 0 \end{bmatrix} = \begin{bmatrix} 1 \\ 1 \\ 0 \end{bmatrix}$  $\begin{bmatrix} 1 & 1 \\ 1 & 0 \\ 0 & 1 \end{bmatrix} \begin{bmatrix} 1 \\ 1 \end{bmatrix} = \begin{bmatrix} 0 \\ 1 \\ 1 \end{bmatrix}$ (c)

| Systematic Bit | Simplex Code |
|---|---|
| 0 0 | 0 0 0 |
| 0 1 | 1 0 1 |
| 1 0 | 1 1 0 |
| 1 1 | 0 1 1 |

Puncturing(a)
Puncturing(b)

METHOD FOR TRANSMITTING CONTROL INFORMATION, AND METHOD FOR GENERATING CODEWORD FOR THE SAME

CROSS-REFERENCE TO RELATED APPLICATIONS

This application is a continuation of U.S. patent application Ser. No. 12/118,592, filed on May 9, 2008, now U.S. Pat. No. 8,498,345, which claims the benefit of earlier filing date and right of priority to Korean Patent Application No. 10-2007-0107595, filed on Oct. 25, 2007, and also claims the benefit of U.S. Provisional Application Ser. No. 60/917,161, filed on May 10, 2007, and U.S. Provisional Application Ser. No. 60/943,293, filed on Jun. 11, 2007, the contents of which are all hereby incorporated by reference herein in their entireties.

This application also claims the benefit of U.S. Provisional Application Ser. Nos. 60/917,161, filed on May 10, 2007 and 60/943,293, filed on Jun. 11, 2007, the contents of which are hereby incorporated by reference herein in their entirety.

BACKGROUND OF THE INVENTION

1. Field of the Invention

The present invention relates to a method for transmitting downlink control information and a method for generating a codeword for the same.

2. Discussion of the Related Art

Among fundamentals of basic code theories, a few things necessary for a description of the present invention will now be explained.

When a typical binary error correction code is represented as [n, k, d], 'n' means the number of bits of an encoded codeword, 'k' means the number of information bits before encoding, and 'd' means a minimum value among distances between codewords. Here, since the codeword is a binary code, the length of the codeword is $2^n$ and the total number of the encoded codewords is $2^k$. On the other hand, the binary error correction code may be simply expressed as an [n, k] code for convenience.

Hereinafter, 'n', 'k' and 'd' will have the abovementioned meanings unless otherwise stated.

A code rate R is defined as a value dividing the number of information bits by the number of bits of a codeword (i.e., R=k/n).

A Hamming distance is the number of bits of which corresponding bit values are different in binary codes having the same number of bits. If a Hamming distance 'd' is equal to or greater than (2a+1), errors as many as 'a' can be corrected. For example, two codewords are '101011' and '110010', a Hamming distance between the two codewords is 3 and one error can be corrected.

A minimum value among distances between any two codewords belonging to a code is defined as a minimum distance. The minimum distance is one of important metrics to evaluate performance of a code. The aforementioned Hamming distance can be used as a distance between two codewords. As a distance between codewords generated through an encoding process becomes greater, since the probability that a corresponding codeword is judged to be a different codeword becomes lower, encoding performance is increased. The performance of a code is determined by a distance between codewords having the worst performance, i.e., a minimum distance between codewords. Consequently, a code in which minimum distance is maximized shows good performance.

Meanwhile, a 3GPP LTE (3rd Generation Partnership Project Long Term Evolution) system has proposed that information indicating a format of a control channel during transmission of control information be transmitted through a physical control format indicator channel ("PCFICH"). The PCFICH demands to transmit a code having a very low code rate to minimize an occurrence of an error during transmission since information on a format transmitting control information is transmitted therethrough.

However, in generating a long-length code having a very low code rate, it is difficult to set a minimum distance between codewords to a maximum value.

SUMMARY OF THE INVENTION

An object of the present invention devised to solve the problem provides a method for constructing a code such that a minimum distance between codes is maximized and simultaneously generating a long-length code having a low code rate and a method for transmitting a control signal using the same.

For this end, a long-length code is generated by repeating a basic code. When a code of a predetermined length can not be generated by simply repeating the basic code, an appropriate adjustment is performed to generate the code having the predetermined length while satisfying a condition that a minimum distance between codes is maximized.

Another object of the present invention provides a method for transmitting downlink control information using a code generated by the above-described method.

The object of the present invention can be achieved by providing a method for transmitting control information through a downlink by a system. The method includes: transmitting the control information through a downlink control channel; and transmitting information on the number of OFDM (orthogonal frequency division multiplexing) symbols occupied by the control information on the downlink control channel by using a prescribed code, wherein the prescribed code is one of (0,1,1,0,1,1,0,1,1,0,1,1,0,1,1,0,1,1,0,1,1,0,1,1,0,1,1,0,1, 1,0,1), (1,0,1,1,0,1,1,0,1,1,0,1,1,0,1,1,0,1,1,0,1,1,0,1,1,0,1,1,0, 1,1,0), (1,1,0,1,1,0,1,1,0,1,1,0,1,1,0,1,1,0,1,1,0,1,1,0,1,1,0,1,1, 0,1,1), and (0,0,0,0,0,0,0,0,0,0,0,0,0,0,0,0,0,0,0,0,0,0,0,0,0,0,0,0,0, 0,0,0), according to information on the number of OFDM symbols occupied by the control information.

The information on the number of OFDM symbols occupied by the control information on the downlink control channel may be a control format indicator (CFI), and the information on the number of OFDM symbols occupied by the control information on the downlink control channel may be transmitted through a physical control format indicator channel (PCFICH).

The prescribed code may be (0,1,1,0,1,1,0,1,1,0,1,1,0,1,1,0,1,1,0,1,1,0,1,1,0,1,1,0, 1,1, 0,1) when the number of OFDM symbols occupied by the control information is 1, (1,0,1,1,0,1,110,1,1,0,1,1,0,1,1,0,1,1,0,1,1,0,1,1, 0,1,1,0) when the number of OFDM symbols occupied by the control information is 2, and (1,1,0,1,1,0,1,1,0,1,1,0,1,1,0,1,1,0,1,1,0,1,1,0,1,1,0,1, 1,0, 1,1) when the number of OFDM symbols occupied by the control information is 3.

In another aspect of the present invention, provided herein is a method for receiving control information through a downlink by a User Equipment (UE). The method includes: receiving information on the number of OFDM symbols occupied by the control information on a downlink control channel by using a prescribed code; and receiving the control information through the downlink control channel by using the prescribed code, wherein the prescribed code is one of (0,1,1,0,1,1,0,1,1,0,1,1,0,1,1,0,1,1,0,1,1,0,1,1,0,1,1,0,1,1, 0,1),
(1,0,1,1,0,1,1,0,1,1,0,1,1,0,1,1,0,1,1,0,1,1,0,1,1,0,1,1,0,1, 1,0),
(1,1,0,1,1,0,1,1,0,1,1,0,1,1,0,1,1,0,1,1,0,1,1,0,1,1,0,1,1,0, 1,1), and
(0,0,0,0,0,0,0,0,0,0,0,0,0,0,0,0,0,0,0,0,0,0,0,0,0,0,0,0,0,0, 0,0), according to the number of OFDM symbols occupied by the control information.

In a further aspect of the present invention, provided herein is a method for generating a codeword. The method includes: acquiring information on the number of OFDM symbols occupied by control information on a downlink control channel; and generating the codeword according to the acquired information, wherein the codeword is generated by repeating any one of simplex codes (0, 1, 1), (1, 0, 1), (1, 1, 0), and (0, 0, 0) by 11 times and puncturing the last one bit.

In still another aspect of the present invention, provided herein is a method for generating a codeword. The method includes: acquiring information on the number of OFDM symbols occupied by control information on a downlink control channel; and generating the codeword according to the acquired information, wherein the codeword is generated by repeating any one of simplex codes (0, 1, 1), (1, 0, 1), (1, 1, 0), and (0, 0, 0) by 9 times and inserting any one of Hamming codes (0, 1, 1, 0, 1), (1, 0, 1, 1, 0), (1, 1, 0, 1, 1), and (0, 0, 0, 0, 0).

In still yet another aspect of the present invention, provided herein is a method for generating a codeword. The method includes: acquiring information on the number of OFDM symbols occupied by control information on a downlink control channel; and generating the codeword according to the acquired information, wherein the acquired information is expressed as 2 information bits, and the codeword is generated by repeating any one of simplex codes (0, 1, 1), (1, 0, 1), (1, 1, 0), and (0, 0, 0) by 10 times and inserting the information bits.

According to the aspects of the present invention, a long code having a low code rate can be generated by a simple method while a minimum distance between codes is maximized.

Moreover, control information can be transmitted with a low error rate by representing information on the number of OFDM symbols occupied by the control information using the generated code.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Hereinafter, preferred embodiments of the present invention will be described in detail with reference to the annexed drawings. The detailed description, which will be given below with reference to the accompanying drawings, is intended to explain exemplary embodiments of the present invention, rather than to show the only embodiments that can be implemented according to the invention.

The following description provides specific details for a thorough understanding of embodiments of the invention. However, one skilled in the art will understand that the invention may be practiced without these details. In other instances, well-known structures and functions have not been described in detail or may be shown in block diagram form to avoid unnecessarily obscuring the description of embodiments of the invention. Wherever possible, the same reference numbers will be used throughout the drawings to refer to the same or like parts.

In generating a long code having a low code rate, there are provided a method for constructing a code such that a minimum distance between codes is maximized and simultaneously generating the long code by a simple method and a method for transmitting a control signal using the same. For this end, a condition that a minimum distance between codes is maximized will be considered in detail.

In the following description of the present invention, a concept of a normalized minimum distance is introduced as a method for comparing various coding techniques. Namely, in a binary error correction code [n, k, d], a value dividing a minimum distance 'd' by the number 'n' of bits of a codeword is defined as the normalized minimum distance and the normalized minimum distance is expressed as $\hat{d}$ for convenience of description.

That is, the normalized minimum distance can be expressed as follows.

$$\hat{d} = \frac{d}{n} \qquad \text{[Equation 1]}$$

Hereinafter, the Plotkin bound will be explained to consider conditions for setting a minimum distance between codes to a maximum value. A detailed description of the Plotkin bound is disclosed in detail in "John G. Proakis, Wiley Encyclopedia of Telecommunications, Wiley Interscience, New Jersey, 2003, vol. 2, pp 929-935".

The Plotkin bound is summarized in brief as follows.

When a general binary error correction code is expressed as [n, k, d], 'n' means the number of bits of a encoded codeword, 'k' means the number of information bits before encoding, and 'd' means a minimum value among distances between codewords. The above-described Plotkin bound can be expressed as follows.

$$\begin{cases} 2^k \le 2\left(\dfrac{d}{2d-n}\right) & \text{if } d = \text{even}, d > \dfrac{n}{2} \\ 2^k \le 4d & \text{if } d = \text{even}, d = \dfrac{n}{2} \\ 2^k \le 2\left(\dfrac{d+1}{2d+1-n}\right) & \text{if } d = \text{odd}, d > \dfrac{n-1}{2} \\ 2^k \le 4(d+1) & \text{if } d = \text{odd}, d = \dfrac{n-1}{2} \end{cases} \quad \text{[Equation 2]}$$

Plotkin bound expressed as indicated in Equation 2 can again be expressed based on the minimum distance d as follows.

$$\begin{cases} d \le n \times \dfrac{2^{k-1}}{2^k - 1} & \text{if } d = \text{even}, d > \dfrac{n}{2} \\ d = \dfrac{n}{2} \ge 2^{k-2} & \text{if } d = \text{even}, d = \dfrac{n}{2} \\ d \le (n-1) \times \dfrac{2^{k-1}}{2^k - 1} + \dfrac{1}{2^k - 1} & \text{if } d = \text{odd}, d > \dfrac{n-1}{2} \\ d = \dfrac{n-1}{2} \ge 2^{k-2} - 1 & \text{if } d = \text{odd}, d = \dfrac{n-1}{2} \end{cases} \quad \text{[Equation 3]}$$

A method for generating a code expressed generally as [n, k, d] will now be considered with reference to the above Equation 3 according to an exemplary embodiment of the present invention. If the minimum distance d is greater than half of a code length (i.e., d>n/2), it is desirable to design an optimal code so as to satisfy the above-described Plotkin bound.

Here, it is assumed in the exemplary embodiment of the present invention that a generated code has a low code rate (i.e., $n > 2^k$). When $n=2^k$, an orthogonal code can be generated and a minimum distance of the orthogonal code is n/2. Therefore, it makes sense to consider only the following two cases with respect to the Plotkin bound at a low code rate assumed in this exemplary embodiment of the present invention.

$$\begin{cases} d \le n \times \dfrac{2^{k-1}}{2^k - 1} & \text{if } d = \text{even}, d > \dfrac{n}{2} \\ d \le (n-1) \times \dfrac{2^{k-1}}{2^k - 1} + \dfrac{1}{2^k - 1} & \text{if } d = \text{odd}, d > \dfrac{n-1}{2} \end{cases} \quad \text{[Equation 4]}$$

Under the above conditions indicated in Equation 4, cases where the minimum distance d is an even number and an odd number will now be described.

First, assuming that the minimum distance d is an even number, a maximum value of the minimum distance d is $$n \times \frac{2^{k-1}}{2^k - 1}$$

as known from the first expression of Equation 4. When considering the normalized minimum distance d obtained by dividing the minimum distance by the number of bits of a codeword, a maximum value of the normalized minimum distance $\hat{d}$ is $$\frac{2^{k-1}}{2^k - 1}.$$

Therefore, if an entire code can be constructed by repeating a code of which normalized minimum distance $\hat{d}$ is $$\frac{2^{k-1}}{2^k - 1},$$

since a maximum value of a minimum distance is satisfied, the constructed code can be an optimal code in terms of the minimum distance.

Next, assuming that the minimum distance is an odd number, a maximum value of the minimum distance d is $$(n-1) \times \frac{2^{k-1}}{2^k - 1} + \frac{1}{2^k - 1}$$

as known from the second expression of Equation 4. Then a maximum value of the normalized minimum distance $\hat{d}$ becomes $$\frac{2^{k-1}}{2^k - 1} + \frac{1}{2^k - 1}.$$

Therefore, when an entire code can be constructed by repeating a code of which normalized minimum distance $\hat{d}$ approximates to $$\frac{2^{k-1}}{2^k - 1},$$

a maximum value of a minimum distance is satisfied and the constructed code becomes an optimal code in terms of the minimum distance.

An example of a code of which normalized minimum distance is $$\frac{2^{k-1}}{2^k - 1}$$

a simplex code.

The simplex code has a property of $[2^k-1, k, 2^{k-1}]$ and each normalized distance between codewords is the same as $$\frac{2^{k-1}}{2^k - 1}.$$

The simplex code can geometrically be represented as vertexes in a unit cube of a $(2^k-1)$ dimension. A dual code of the simplex code is a Hamming code having a minimum distance 3.

The simplex code is also known as a maximal length shift register code, an m-sequence, or a Pseudo-random noise (PN) sequence. When a code is a binary code expressed as +1 and −1 and the number of codewords is M, a correlation function between different codewords is the same as −1/(M−1) (where M is an even number) or −1/M (where m is an odd number). In the simplex code, a maximum correlation function between different codewords among binary codes of the same number of codewords is minimized.

An entire code represented as [n, k, d] according to an exemplary embodiment of the present invention is generated as follows. First, a simplex code $[2^k-1, k, 2^{k-1}]$ is generated as a basic code and repeated until an entire code length becomes n. Then a long code of which normalized minimum distance is $$\frac{2^{k-1}}{2^k - 1}$$

can be generated.

In some cases, however, the entire code length n may not be a multiple of the basic code length $2^k-1$. In an exemplary embodiment of the present invention, a method for generating a code having a length n when the entire code length n is not a multiple of the basic code length $2^k-1$ is proposed.

Figure 1:
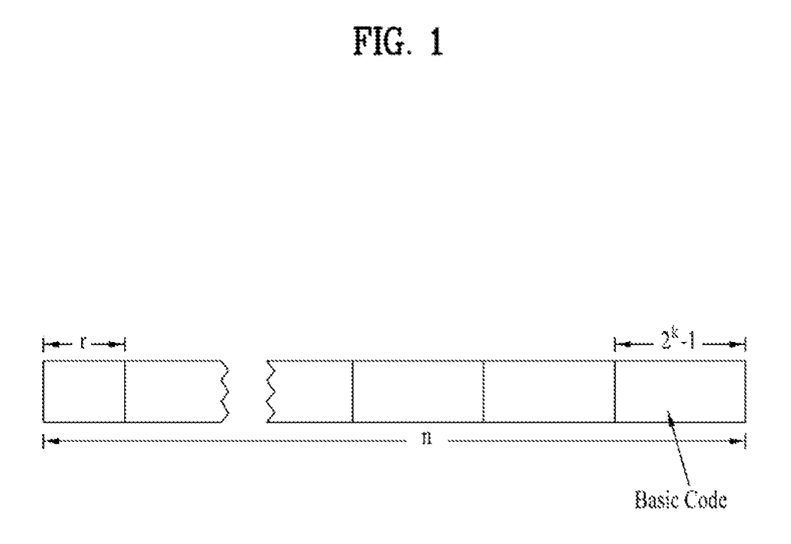
FIG. 1 is a diagram for explaining a process of generating a long-length code having a low code rate according to an exemplary embodiment of the present invention.

FIG. 1 is a diagram for explaining a process of generating a long-length code having a low code rate according to an exemplary embodiment of the present invention.

As illustrated in FIG. 1, a case where a code length n is not a multiple of $2^k-1$ is considered. Namely, it is assumed that $n=m(2^k-1)+r$ (where m is the number of repetitions of a basic code).

When the above relationship is satisfied, a method for generating a code having a length n is proposed as follows.

First, a simplex code satisfying $[2^k-1, k, 2^{k-1}]$ is generated as a basic code. Next, a code repeating the basic code as many as m times is generated. Finally, r bits are generated by puncturing the simplex code or by using any other codes of which minimum distance is maximized.

As a method for generating the r bits when k is a small number, a code capable of maximizing a minimum distance may be considered by searching all the possible cases. A general assumption for the r bits is that r is less than a basic code length $2^k-1$. However, r may be greater than $2^k-1$ according to a specific exemplary embodiment of the present invention which will be described.

After the basic code having a length $2^k-1$ is repeated, a process for adjusting prescribed bits to generate a code having a length n may be various and this will be described hereinafter in detail.

The above-described code generating process will now be described in detail in terms of a minimum distance.

First, the Plotkin bound of a minimum distance at a low code rate needs to consider only the following two cases (where $n=m(2^k-1)+r$).

When a code length n $(=m(2^k-1)+r)$ is not a multiple of a basic code length, a code generating method is as follows.

That is, there are a part constructed by repeating a simplex code satisfying $[2^k-1, k, 2^{k-1}]$ by m times and an [r, k] code part obtained by adding r bits. The added [r, k] may be constructed in many ways and it is desirable to meet the next minimum distance (hereinafter, referred to as $d_r$ for convenience of description) from the Plokin bound.

$$[r, k, d_r] \ldots d_r = \begin{cases} \leq r \times \frac{2^{k-1}}{2^k - 1} & \text{if } d = \text{even}, d > \frac{n}{2} \\ \leq \frac{(r-1)2^{k-1}+1}{2^k - 1} & \text{if } d = \text{odd}, d > \frac{n-1}{2} \end{cases}$$ [Equation 6]

where $d_r$ has an integral value.

The [r, k] code may be constructed in many ways, for example, by puncturing prescribed bits in a simplex code used for repetition or using other codes except for the simplex code. However, in adjusting r bits, it is important to generate a code approximating to the Plotkin bound for a minimum distance indicated in Equation 6.

On the other hand, a meaningful range of the value r will be considered hereinafter.

As described above, a code having a length r may be constructed by puncturing prescribed bits in a simplex code used for repetition or using other codes except for the simplex code. When a code having a length r is generated by using a code different from the simplex code so that a minimum distance between codes is maximized, there is no necessity for limiting the value r to a specific range. In other words, the value r may be less or greater than the basic code length $2^k-1$. If the value r is greater than $2^k-1$, any code satisfying a condition that a minimum distance between codes is maximized within the Plotkin bound can be generated.

On the other hand, when a different code except for the simplex code is not used, since the code length n is equal to $m(2^k-1)+r$, r is less than $(2^k-1)$. Therefore, the range of r varies according to k. There is no need to consider a case where r is less than k. In this case, since r which is less than the number k of bits to be actually transmitted is used, coding performed by adding redundant bits is meaningless. Consequently, a meaningful range of r becomes $[k, 2^k-2]$ unless a code except for the simplex code is used to generate a code having a length r.

However, if r is equal to k (i.e., r=k), then it is desirable to transmit a given information bit (a systematic bit) to maximize a minimum distance.

Hereinafter, a method for generating a long code having a low code rate will be described as a basic embodiment for convenience of description.

[Equation 5]

$$\begin{cases} d \leq n \times \frac{2^{k-1}}{2^k - 1} = \{m(2^k - 1) + r\} \times \frac{2^{k-1}}{2^k - 1} & \text{if } d = \text{even}, d > \frac{n}{2} \\ \quad = m \times 2^{k-1} + r \times \frac{2^{k-1}}{2^k - 1} & \\ d \leq (n-1) \times \frac{2^{k-1}}{2^k - 1} + \frac{1}{2^k - 1} = (m(2^k - 1) + r - 1) \times \frac{2^{k-1}}{2^k - 1} + \frac{1}{2^k - 1} & \text{if } d = \text{odd}, d > \frac{n-1}{2} \\ \quad = m \times 2^{k-1} + \frac{(r-1)2^{k-1}+1}{2^k - 1} & \end{cases}$$

Figure 2:
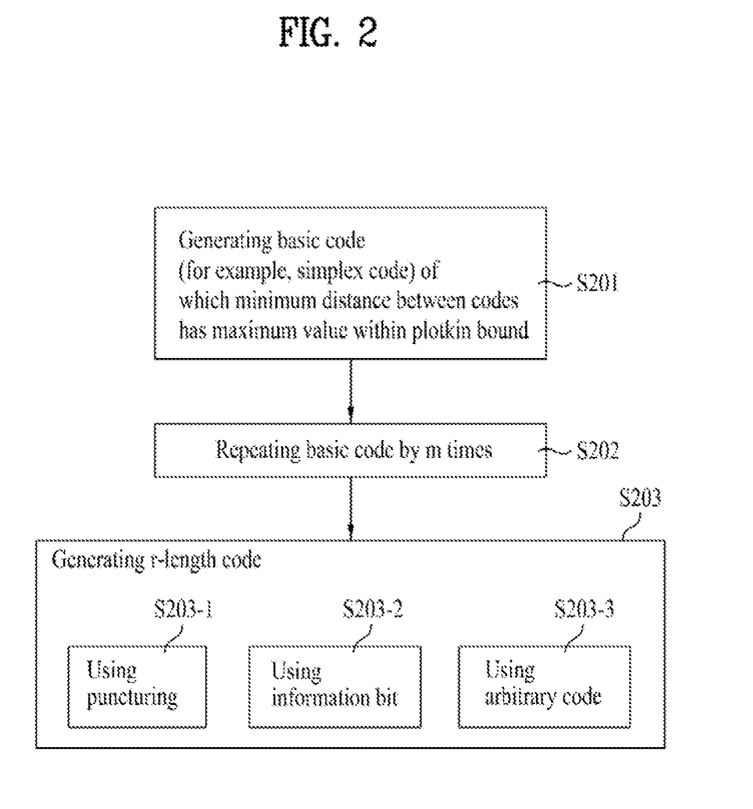
FIG. 2 is a flow chart schematically illustrating a process of generating a long-length code having a low code rate according to an exemplary embodiment of the present invention.

FIG. 2 is a flow chart schematically illustrating a process of generating a long-length code having a low code rate according to an exemplary embodiment of the present invention.

Referring to FIG. 2, a basic code of which minimum distance between codes has a maximum value within the Plotkin bound is generated at step S201. A typical code satisfying the above condition may be a simplex code. However, if there are other codes of which minimum distance between codes has a maximum value within the Plotkin bound, those codes may be used.

The basic code is repeated by m times at step S202. When a code of which minimum distance between codes is maximized is repeated, a condition that the minimum distance is maximized within the Plotkin bound is satisfied like a basic code in terms of a normalized minimum distance.

However, when a code length n is not a multiple of the basic code length, the other length r is generated in step S203. Although there may be many methods for generating a code having a length r, it is desirable to set the code having the length r to have a minimum distance of a maximum value within the Plotkin bound in terms of the normalized minimum distance.

For this end, prescribed bits in the basic code used for repetition are punctured as shown in step S203-1. If the other length r is equal to the number of information bits, the information bit is used as the r-length code as shown in step S203-2. If the length r is equal to a length of any arbitrary code satisfying a maximum-minimum distance condition within the Plotkin bound, the arbitrary code is used as the r-length code as shown in step S203-3.

Hereinafter, methods for generating the r-length code according to the embodiment of the present invention, for example, a method using puncturing and various modifications of a code generating method will be described.

Furthermore, a method for generating a [32,2] code (or (32, 2) code) by applying the code generating method to a 3GPP LTE system, and a method for transmitting a control signal using the [32,2] code will be described.

First, a method for generating the r-length code using puncturing will now be described according to the embodiment of the present invention.

Method for Generating an r-Length Code Using Puncturing

An optimal code generating method using puncturing in a case where a code length n is not a multiple of $(2^k-1)$ will be described in detail. First, a basic code of a short length is generated and then the basic code is repeated so that the basic code may be greater than the code length n. The excessive bits are punctured from the basic code. A method for optimally selecting a puncturing location in a puncturing process is proposed as follows.

In generating an [r, k] code of which minimum distance is maximized within the Plotkin bound, a method for constructing a $[2^k-1, k, 2^{k-1}]$ simplex code using puncturing is considered. The number of puncturing bits is $2^k-1-r$ and a condition for determining the puncturing locations of $(2^k-1-r)$ bits is to maximally keep a minimum distance within the Plotkin bound.

The puncturing location may be determined in various ways. As a simple and sure example, all possible puncturing locations may be checked. That is, if the number $(2^k-1-r)$ of puncturing locations is small and thus the number of possible puncturing locations is small, all possible cases may be tested. In this case, optimal puncturing locations may be determined by checking whether a condition that a minimum distance is maximally maintained within the Plotkin bound is satisfied while varying the puncturing locations.

A fixed puncturing location may be used. If the number of puncturing bits is $2^k-1-r$, a method for successively puncturing $2^k-1-r$ bits from the first bit location is considered. In more detail, $(2^k-1-r)$ bits corresponding to the number of puncturing bits are punctured from the first bit location from the $[2^k-1, k, 2^{k-}]$ simplex code. However, since this method can not ensure a condition that a minimum distance is maximally maintained within the Plotkin bound, is necessary to check whether a code generated after puncturing meets the above condition.

Hereinafter, whether the minimum distance condition is satisfied will be described when puncturing successive bits from the first location in puncturing a simplex code. If the code length n is $m(2^k-1)+r$, a meaningful range of r is [k, $2^k-2$] (from k to $2^k-2$, both inclusive).

It is assumed that k is 2. Since k is 2, r is less than 3 ($=2^2-1$) and an effective range of r is [2, 2] (from 2 to 2, both inclusive). Therefore, only a case where r=2 is considered. In this case, original two information bits are used as an r-length code and this shows the same result as a case where the first bit is punctured from a [3, 2, 2] simplex code.

This will be described with reference to FIGS. 3A to 3C.

Figure 3:
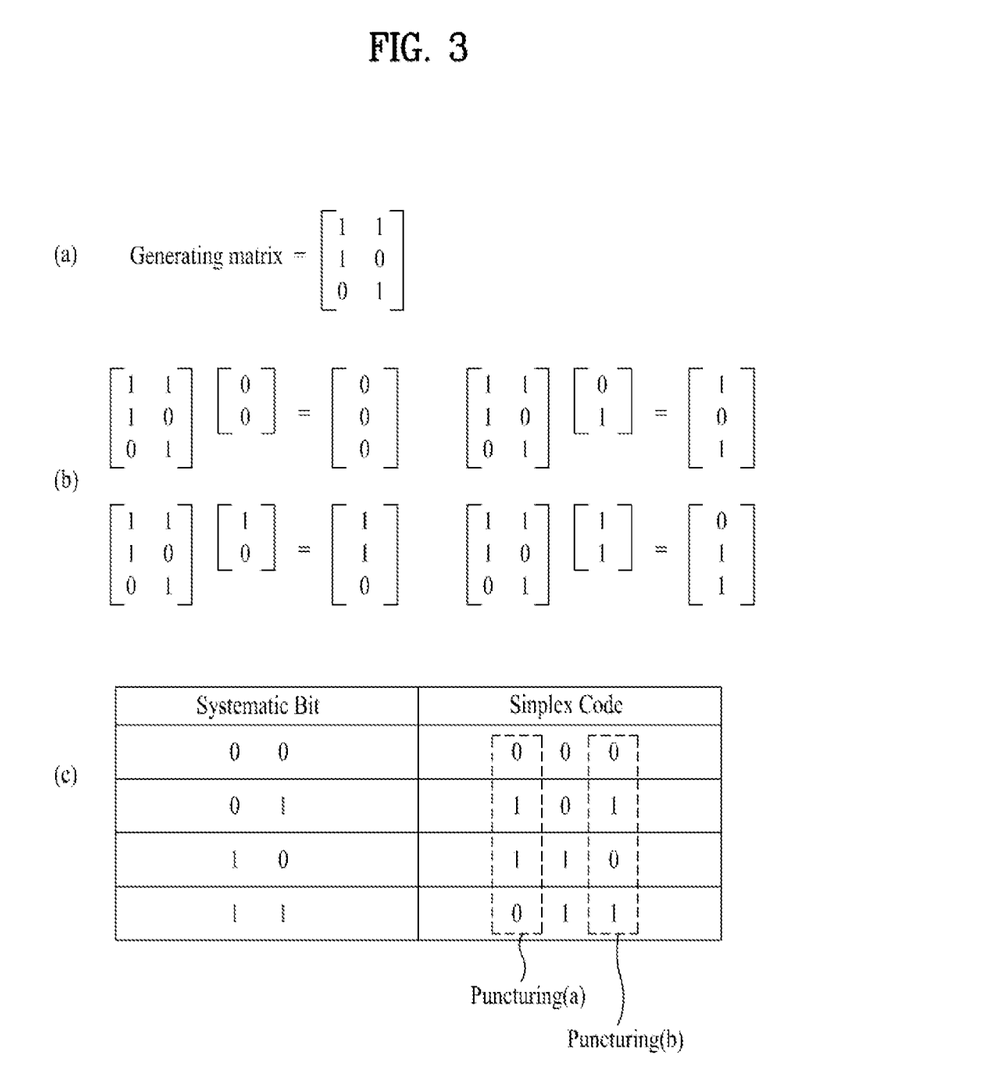
FIGS. 3A to 3C are diagrams for explaining a relationship between a puncturing position of a simplex code and an information bit according to an exemplary embodiment of the present invention.

FIGS. 3A to 3C are diagrams for explaining a relationship between a puncturing location of a simplex code and an information bit.

A matrix used to generate a [3, 2, 2] simplex code is illustrated in FIG. 3A. In FIG. 3B, a process for generating simplex codes (0, 0, 0), (1, 0, 1), (1, 1, 0), (0, 1, 1) with respect to information bits (0, 0), (0, 1), (1, 0), (1, 1), respectively is illustrated.

In generating the r-length code, it is effective to use only the information bit when r=2. This shows the same result as a case where the first bit of the [3, 2, 2] simplex code is punctured as shown by Puncturing(a) in FIG. 3C.

When the first bit of the [3, 2, 2] simplex code is punctured or only the information bit is used, the Plotkin bound can be expressed as follows.

$$[2, 2, d_r] \ldots d_r = \begin{cases} \leq 2 \times \frac{2^{2-1}}{2^2-1} = \frac{4}{3} & \text{if } d = \text{even}, d > \frac{n}{2} \\ \leq \frac{(2-1)2^{2-1}+1}{2^2-1} = \frac{4}{3} & \text{if } d = \text{odd}, d > \frac{n-1}{2} \end{cases}$$ [Equation 7]

Under a Plotkin bound condition indicated in Equation 7, it is desirable that an integral $d_r$ satisfies a maximum value 1.

Meanwhile, when the first bit is punctured from the [3, 2, 2] simplex code or only the information bit is used, since a minimum distance between codes is 1 as known from FIG. 3C, the condition that the minimum distance is maximized within the Plotkin bound is satisfied.

Therefore, if k=2 and r=2 in generating the r-length code using puncturing, it is proposed that the first bit is punctured from the [3, 2, 2] simplex code and this shows the same result as a case where the information bit is used as the r-length code.

Next, it is assumed that k=3.

If k is 3, r is less than 7 ($=2^3-1$) and an effective range of r is [3, 6] (from 3 to 6, both inclusive). Therefore, only the cases where r is 3, 4, 5 and 6 are considered.

If r is 6, it is possible to generate the r-length code by puncturing the first bit from a [7, 3, 4] simplex code. In this case, the Plotkin bound can be calculated as follows.

$$[6, 3, d_r] \ldots d_r = \qquad \text{[Equation 8]}$$

$$\begin{cases} \leq 6 \times \dfrac{2^{3-1}}{2^3-1} = \dfrac{24}{7} & \text{if } d = \text{even}, d > \dfrac{n}{2} \\ \leq \dfrac{(6-1)2^{3-1}+1}{2^3-1} = \dfrac{21}{7} & \text{if } d = \text{odd}, d > \dfrac{n-1}{2} \end{cases}$$

Then an integral $d_r$ has an upper limit of 24/7 or 21/7 and therefore a maximum integer value of $d_r$ is 3.

A case where d is either an even number or an odd number is considered for the Plotkin bound and then the other case will be naturally derived. Hereinafter, only a case where d is an even number will be described.

When calculating a minimum distance by puncturing the first bit from the [7, 3, 4] simplex code, the minimum distance of 3 is obtained. Then it will be understood that the Plotkin bound condition is satisfied.

Therefore, if k=3 and r=6 in generating the r-length code using puncturing according to the exemplary embodiment of the present invention, it is proposed to puncture the first bit from the [7, 3, 4] simplex code.

Next, a case where k=3 and r=5 is considered.

In this case, a method for puncturing two successive bits, that is, the first and second bits from the [7, 3, 4] simplex code is described. The Plotkin bound is calculated as follows.

$$[5, 3, d_r] \ldots d_r \leq 5 \times \dfrac{2^{3-1}}{2^3-1} = \dfrac{20}{7} \text{ if } d = \text{even}, d > \dfrac{n}{2} \qquad \text{[Equation 9]}$$

As described above, since only the case where d is an even number is considered, a maximum value of an integral $d_r$ is 2 as known from Equation 9.

Meanwhile, since a minimum distance when the first and second bits are punctured from the [7, 3, 4] simplex code is 2, the above Plotkin bound condition is satisfied.

Therefore, if k=3 and r=5 in generating the r-length code using puncturing, it is proposed to generate the code by puncturing two successive bits, that is, the first and second bits from the [7, 3, 4] simplex code.

Next, a case where k=3 and r=4 is considered.

In this case, a method for generating a code by puncturing three successive bits, that is, first to third bits from the [7, 3, 4] simplex code is considered. The Plotkin bound is calculated as follows.

$$[4, 3, d_r] \ldots d_r \leq 4 \times \dfrac{2^{3-1}}{2^3-1} = \dfrac{16}{7} \text{ if } d = \text{even}, d > \dfrac{n}{2} \qquad \text{[Equation 10]}$$

It will be understood that a maximum value of an integral $d_r$ is 2 from the above Equation 10.

When calculating a minimum distance by puncturing the first to third bits from the [7, 3, 4] simplex code, the minimum distance of 2 is obtained and the Plotkin bound condition is satisfied.

Therefore, if k=3 and r=4 in generating the r-length code using puncturing, it is proposed to generate a code by puncturing three successive bits of the first to third bits from the [7, 3, 4] simplex code.

Finally, a case where k=3 and r=3 is considered.

In this case, a method for generating a code by puncturing four successive bits of the first to fourth bits from the [7, 3, 4] simplex code is considered. In this case, the Plotkin bound is calculated as follows.

$$[3, 3, d_r] \ldots d_r \leq 3 \times \dfrac{2^{3-1}}{2^3-1} = \dfrac{12}{7} \text{ if } d = \text{even}, d > \dfrac{n}{2} \qquad \text{[Equation 11]}$$

It will be understood that a maximum value of an integral $d_r$ is 1 from the above Equation 11.

Since a minimum distance calculated by puncturing four successive bits from the [7, 3, 4] simplex code is 1, the above Plotkin bound condition is satisfied.

The above case where r is equal to k may also be explained as the case where three information bits (or systematic bits) are used as the r-length code.

Therefore, if k=3 and r=3 in generating the r-length code, it is proposed to puncture four successive bits of the first to fourth bits from the [7, 3, 4] simplex code or to use the information bit as the r-length code.

Methods for generating the r-length code using puncturing when k=2 and k=3 may be generalized so that the methods may be applied to cases where k is 4 or more.

That is, even when k is 4 or more, it is possible to generate an [r, k] code by successively puncturing $(2^k-1-r)$ bits from the first bit location from a $[2^k-1, k, 2^{k-1}]$ simplex code.

Modification 1

However, the puncturing locations punctured successively from the first bit of $(2^k-1-r)$ bits do not mean the only locations which maximize a minimum distance within the Plotkin bound. In some cases, the r-length code of which minimum distance is maximized within the Plotkin bound may be generated even when corresponding bits are punctured in other locations.

For example, in puncturing one bit when k=2 and r=2, the last bit may be punctured instead of the first bit so that the r-length code of which $d_r$ value becomes a maximum value within the Plotkin bound. That is, it will be appreciated that $d_r$ is 1 even when a puncturing location of one bit is the third bit as indicated by Puncturing(b) in FIG. 3C.

Modification 2

When an entire code of a simplex code of which normalized minimum distance has a maximum value is expressed as a matrix, a characteristic of a minimum distance is not varied even though location of either a row or a column or locations of both the row and column are permutated.

Therefore, in repeating a simplex code by m times, an optimal characteristic of a minimum distance is not varied even though locations of a row and column of a code having a small length are varied. Accordingly, it is possible to obtain a desired optimal minimum distance even though a form of the simplex code is varied or fixed.

Figure 4:
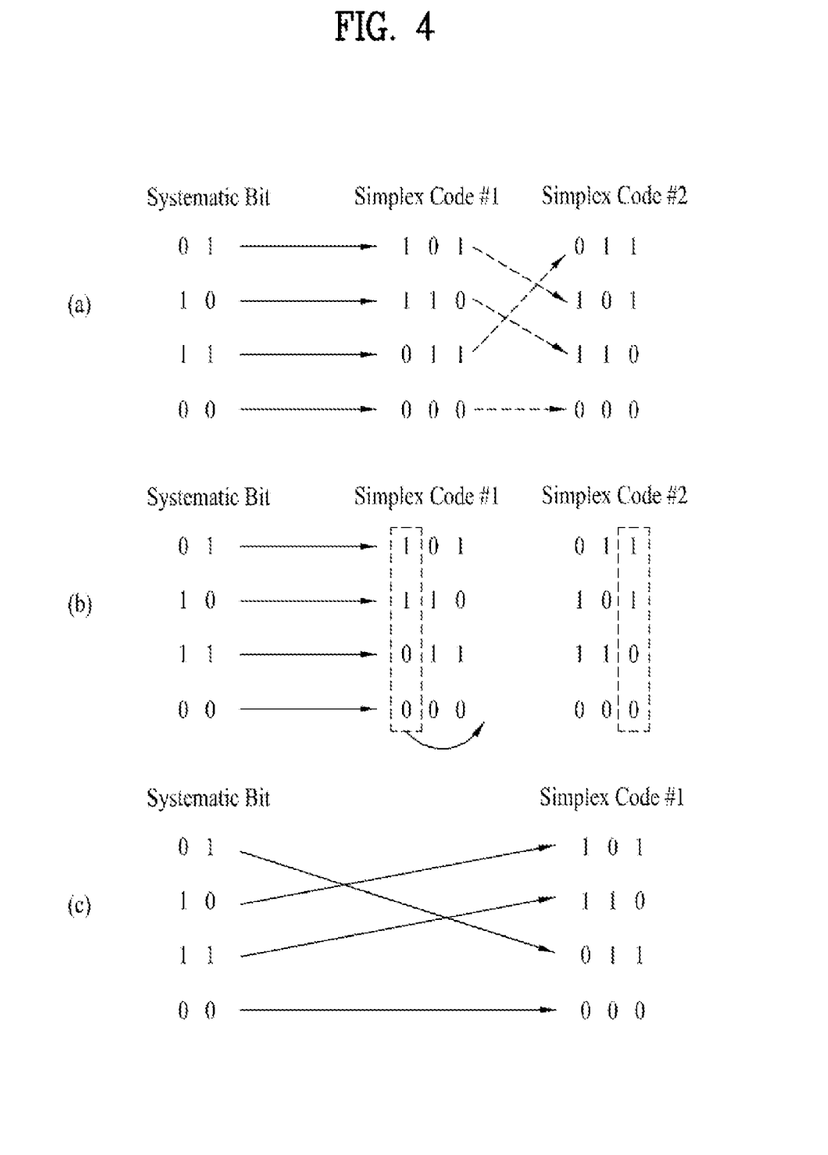
FIGS. 4A to 4C are diagrams for explaining examples of row or column conversion of a basic code in terms of mapping with an information bit according to an exemplary embodiment of the present invention.

FIGS. 4A to 4C are diagrams for explaining examples of row or column conversion of a simplex code in terms of mapping with an information bit.

As described above, even if the location of a column or row of a simplex code as a basic code used for repetition is permutated in generating an n-length code, a minimum distance characteristic is not varied. In this case, permutation of a column or row of the simplex code may mean that a mapping relationship with an information bit is changed.

That is, when information bits (0, 1), (1, 0), (1, 1), and (0, 0) are mapped to simplex codes #1 (1, 0, 1), (1, 1, 0), (0, 1, 1), and (0, 0, 0), respectively as shown in FIG. 4A, simplex codes #2 of which row is permutated may be used instead of the simplex codes #1.

The same result may be described in another aspect as follows. As illustrated in FIG. 4B, when the first column of the simplex codes #1 is permutated to the third column thereof and when the second and third columns of the simplex codes

1 are permutated to the first and second columns thereof, respectively, a code matrix which is the same as the simplex codes #2 illustrated in FIG. 4A is generated.

The permutation of a column or row of the simplex code may correspond to a mapping variation between the information bit and the simplex code as illustrated in FIG. 4C. Namely, in the simplex codes #2, information bits (0, 1), (1, 0), (1, 1), and (0, 0) are mapped to simplex codes (0, 1, 1), (1, 0, 1), (1, 1, 0), and (0, 0, 0), respectively.

Modification 3

Codes of which minimum distance is maximized may be modified in various ways.

First, since a distance between codes is not varied even when 0 and 1 are interchanged, a code may be modified by interchanging 0 and 1 of a generated code.

Second, when an entire code is expressed in a matrix so that each code occupies each row of the matrix, minimum distance characteristic is not varied even though the location of a column or a row or locations of the column and row are permutated. Therefore, it is possible to change a code by exchanging either a column or row or both the column and row of a code matrix of a previously generated code.

In the above description, when the length of an entire code is not a multiple of a basic code in generating a long-length code having a low code rate by using the basic code having a minimum distance characteristic, methods for adjusting the other length part and various modifications of these methods have been considered.

Hereinafter, an example of applying the above code generating methods to a 3GPP LTE system, for instance, a method for generating a (32,2) code and transmitting control information using the (32,2) code will be described.

Example Applied to a (32,2) Code

A control channel format indicator (CFI) indicating the number of control information among orthogonal frequency division multiplexing (OFDM) symbols in one OFDM frame in 3GPP LTE consists of 2 bits. Since the CFI is transmitted through a physical control format indicator channel (PCFICH) throughout 16 quadrature phase shift keying (QPSK) symbols, 32 coding bits are needed. Consequently, a [32,2] code is needed.

Since the performance of a code is proportional to a distance between codes, a code having excellent performance has a large distance between codes. A code of which distance is maximally separated is called a maximum distance separable (MDS) code. The MDS code may be a simplex code as an example of a [3,2] code and a Hamming code as an example of a [5,2] code.

A [3,2] simplex code is as follows:
{000, 101, 011, 110}.

In the [3,2] simplex code, is possible to interchange 0 and 1. Namely, when 0 and 1 are interchanged, the above code set may be used as {111, 010, 100, 001} and the changed code also satisfies a characteristic of the [3,2] simplex code.

A location of each bit in the [3,2] simplex code is exchangeable. This has the same result as a case where each column of the simplex code is changed in the description with reference to FIG. 4B. In other words, when the first and second bits are exchanged from the above code set, a code set {000,011,101,110} is obtained and this code also has a characteristic of the [3,2] simplex code.

The [5,2] Hamming code is as follows:
{00000, 01101, 10011, 11110} or {00000, 01011, 10110, 11101}.

It is also possible to interchange 0 and 1 and to exchange a location of each bit.

Meanwhile, since it is difficult to directly generate a long code having a low code rate such as [32,2] code, a method for generating an entire code by a basic code repeating process as described above is considered.

A basic code uses the [3,2] simplex code. After the basic code is repeated, a bit part generated because the entire length 32 is not a multiple of 3 may be processed by the following methods, for example, a method using puncturing as described in the basic embodiment and its modification examples, a method using an information bit, and a method using the [5,2] Hamming code.

First, a method for repeating the [3,2] simplex code and puncturing one bit will now be described.

According to the exemplary embodiment of the present invention, the [3,2] simplex code is repeated by 11 times and one bit is punctured, thereby generating the [32,2] code.

A puncturing location of one bit may be any location of 33 bits. However, it is desirable that a final code generated by using a puncturing method meets a condition that its minimum distance is maximized within the Plotkin bound.

The [3,2] simplex code may use a code combination such as {000, 101, 011, 110}. This basic code may be used as modified forms as long as a minimum distance property is not varied. For example, there are a method for permuting a column and/or a row of a code, a method for interchanging 0 and 1 of a code, and a method for interchanging 0 and 1 of a code and then exchanging a row and/or column of the code.

In repeating the [3,2] simplex code, it is possible to selectively use simplex codes by 11 times among various [3,2] simplex codes.

Second, a method for repeating the [3,2] simplex code and inserting 2 information bits will be described.

According to an exemplary embodiment of the present invention, the [3,2] simplex code is repeated by 10 times and then 2 information bits are added, thereby generating the [32,2] code.

The locations of the added information bits may be the last part of the [32,2] code. Alternatively, the added bits are positioned at arbitrary locations among 30 bits. The information bits may be successively added or separately added.

The [3,2] simplex code used for repetition may use a code combination such as {000, 101, 011, 110}. Alternatively, it is possible to use various forms within the range of not varying a minimum distance characteristic as described above. For example, there are a method for permuting a column and/or a row of a code, a method for interchanging 0 and 1 of a code, and a method for interchanging 0 and 1 of a code and then permuting a row and/or column of the code.

In repeating the [3,2] simplex code, it is possible to selectively use simplex codes by 10 times among various [3,2] simplex codes.

Finally, a method for repeating the [3,2] simplex code and adding the [5,2] Hamming code will be described.

In this exemplary embodiment, the [3,2] simplex code is repeated by 9 times and then the [5,2] Hamming code is added, thereby generating the [32,2] code.

The added bits of the [5,2] Hamming code are positioned at arbitrary locations among 27 bits. The 5 bits may be successively added or separately added.

The [3,2] simplex code used for repetition may use a code combination such as {000, 101, 011, 110}. Alternatively, it is possible to use various forms instead of the basic code unless a minimum distance characteristic is varied as described above. For example, there are a method for permuting a column and/or a row of a code, a method for interchanging 0 and 1, and a method for interchanging 0 and 1 and then permuting a row and/or column of the code.

The added [5,2] Hamming code may use any one of the following basic codes:

{00000, 01101, 10011, 11110},
{00000, 01101, 11011, 10110},
{00000, 10101, 01011, 11110},
{00000, 10101, 11011, 01110},
{00000, 11101, 01011, 10110},
{00000, 11101, 10011, 01110},
{01000, 00101, 10011, 11110},
{01000, 00101, 11011, 10110},
{01000, 10101, 00011, 11110},
{01000, 10101, 11011, 00110},
{01000, 11101, 00011, 10110},
{01000, 11101, 10011, 00110},
{10000, 00101, 01011, 11110},
{10000, 00101, 11011, 01110},
{10000, 01101, 00011, 11110},
{10000, 01101, 11011, 00110},
{10000, 11101, 00011, 01110},
{10000, 11101, 01011, 00110},
{11000, 00101, 01011, 10110},
{11000, 00101, 10011, 01110},
{11000, 01101, 00011, 10110},
{11000, 01101, 10011, 00110},
{11000, 10101, 00011, 01110},
{11000, 10101, 01011, 00110}

It will be understood that the [5,2] Hamming code has a minimum distance of 3. Since the minimum distance of 3 is equal to a value obtained by adding a minimum distance 2 of the [3,2] simplex code to a minimum distance 1 of an r-length code, a condition that a minimum distance between codes is maximized within the Plotkin bound is satisfied.

In this exemplary embodiment, the [5,2] Hamming code may be used by modifying the above described basic code while satisfying a characteristic of the Hamming code. As possible modifications, there are a method of changing a code order of the [5,2] Hamming code, a method of interchanging 0 and 1 in the [5,2] Hamming code, a method of interchanging 0 and 1 in the [5,2] Hamming code and then changing the order of the code, a method of interchanging locations of bits in the [5,2] Hamming code, a method for interchanging locations of bits in the [5,2] Hamming code and then changing the order of the code, a method for interchanging 0 and 1 in the [5,2] Hamming code and then interchanging locations of bits, and a method of interchanging 0 and 1, interchanging locations of bits, and changing the order of the code.

In repeating the [3,2] simplex code, it is possible to selectively use simplex codes by 10 times among various [3,2] simplex codes.

Examples of the [32,2] code generated by the above-described methods can be expressed as follows.

TABLE 1

<0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1>
<1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0>
<1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1>
<0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0>

The above four codes may be generated by one of the following methods.

First, four [32,2] codes shown in Table 1 may be generated by repeating each of (0, 1, 1), (1, 0, 1), (1, 1, 0), (0, 0, 0) by 11 times and then puncturing the last one bit from the last simplex code. As described in the above Modification 1, if r=2 and k=2, cases where the first bit of the [3,2] simplex code is punctured and the last bit of the [3,2] simplex code is punctured satisfy a condition that the minimum distance is maximized within the Plotkin bound. Therefore, an optimal code can be generated.

Second, when the [3,2] simplex codes (0, 1, 1), (1, 0, 1), (1, 1, 0), and (0, 0, 0) are mapped to information bits (0, 1), (1, 0), (1, 1), and (0, 0), respectively as illustrated in FIG. 4C, the [3,2] simplex codes (0, 1, 1), (1, 0, 1), (1, 1, 0), and (0, 0, 0) are repeated by 10 times and then corresponding information bits are inserted.

Third, four [32,2] codes shown in Table 1 may be generated by repeating the [3,2] simplex codes (0, 1, 1), (1, 0, 1), (1, 1, 0), and (0, 0, 0) by 9 times and then adding (0, 1, 1, 0, 1), (1, 0, 1, 1, 0), (1, 1, 0, 1, 1), and (0, 0, 0, 0, 0) as the [5,2] Hamming code.

Hereinafter, a method for transmitting control information by using the generated [32,2] code will be described.

Figure 5:
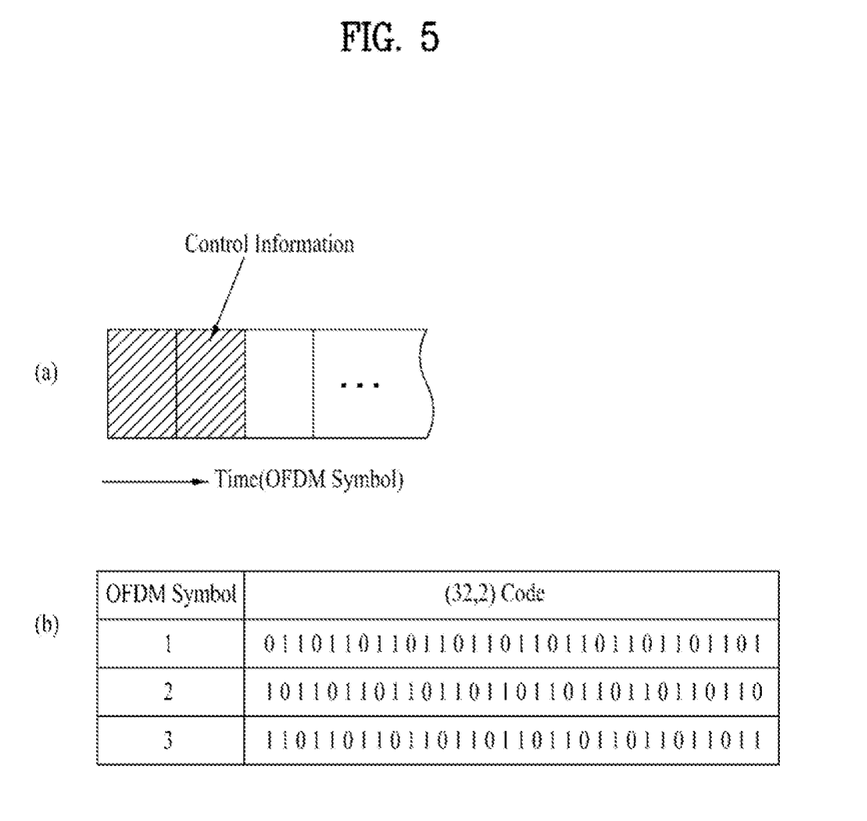
FIGS. 5A and 5B are diagrams for explaining a process of transmitting control information using a [32,2]code according to an exemplary embodiment of the present invention.

FIGS. 5A and 5B are diagrams for explaining a process of transmitting control information using a [32,2]code according to an exemplary embodiment of the present invention.

Information on the number of OFDM symbols occupied by control information among OFDM symbols within one OFDM frame in a 3GPP LTE system is transmitted through a PCFICH and the above-described [32,2] code is used. In FIG. 5A, the control information is transmitted over 2 OFDM symbols within one OFDM frame. Information on the number of OFDM symbols occupied by the control information can be expressed by the [32,2] code as shown in Table 1.

If the number of OFDM symbols occupied by the control information exists as only 3 cases, then only 3 codes may be used among the 4 codes shown in Table 1.

FIG. 5B illustrates an example using only the first, second and third rows among the [32,2] code shown in Table 1 when the control information occupies OFDM symbols 1, 2, and 3.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims.

Therefore, it will be understood that this patent should not be limited to the specific embodiments described herein, but be accorded a right to the broadest scope consistent with the principles and novel features disclosed herein.

The present invention provides a method for generating a long-length code having a low code rate and a method for transmitting control information using the same. These methods may directly be applied to a [32,2] code used for a PCFICH in a 3GPP LTE system. The methods for generating a long-length code having a low code rate by repeating and puncturing a basic code, inserting an information bit, and using arbitrary codes except for the basic code may variously be applied as a method for generating a code utilized to transmit specific information of which error may seriously occur and using the code even in communication systems except for the 3GPP LTE system.

What is claimed is:

1. A method for transmitting control information, the method comprising:
    transmitting a control format indicator about a number of orthogonal frequency division multiplexing (OFDM)

symbols occupied by the control information, wherein the control format indicator is transmitted in a subframe using a prescribed code,
wherein the prescribed code is according to the control format indicator and is one of:
(0,1,1,0,1,1,0,1,1,0,1,1,0,1,1,0,1,1,0,1,1,0,1,1,0,1,1,0,1,1, 0,1),
(1,0,1,1,0,1,1,0,1,1,0,1,1,0,1,1,0,1,1,0,1,1,0,1,1,0,1,1,0,1, 1,0), or
(1,1,0,1,1,0,1,1,0,1,1,0,1,1,0,1,1,0,1,1,0,1,1,0,1,1,0,1,1,0, 1,1).

2. The method according to claim 1, further comprising modulating the prescribed code into quadrature phase shift keying (QPSK) symbols.

3. The method according to claim 1, wherein the control format indicator about the number of OFDM symbols occupied by the control information is transmitted via a physical control format indicator channel (PCFICH).

4. The method according to claim 1, wherein the prescribed code is:
(0,1,1,0,1,1,0,1,1,0,1,1,0,1,1,0,1,1,0,1,1,0,1,1,0,1,1,0,1,1, 0,1) when the number of OFDM symbols occupied by the control information is 1,
(1,0,1,1,0,1,1,0,1,1,0,1,1,0,1,1,0,1,1,0,1,1,0,1,1,0,1,1,0,1, 1,0) when the number of OFDM symbols occupied by the control information is 2, and
(1,1,0,1,1,0,1,1,0,1,1,0,1,1,0,1,1,0,1,1,0,1,1,0,1,1,0,1,1,0, 1,1) when the number of OFDM symbols occupied by the control information is 3.

5. A method for receiving control information via a downlink at a User Equipment (UE), the method comprising:
receiving a control format indicator about a number of orthogonal frequency division multiplexing (OFDM) symbols occupied by the control information, wherein the control format indicator is received via a downlink control channel according to a prescribed code, and
wherein the prescribed code is according to the control format indicator and is one of:
(0,1,1,0,1,1,0,1,1,0,1,1,0,1,1,0,1,1,0,1,1,0,1,1,0,1,1,0,1,1, 0,1),
(1,0,1,1,0,1,1,0,1,1,0,1,1,0,1,1,0,1,1,0,1,1,0,1,1,0,1,1,0,1, 1,0),
(1,1,0,1,1,0,1,1,0,1,1,0,1,1,0,1,1,0,1,1,0,1,1,0,1,1,0,1,1,0, 1,1), or
(0,0,0,0,0,0,0,0,0,0,0,0,0,0,0,0,0,0,0,0,0,0,0,0,0,0,0,0,0,0, 0,0).

6. The method according to claim 5, wherein the prescribed code is received throughout 16 quadrature phase shift keying (QPSK) symbols.

7. The method according to claim 5, wherein the control format indicator about the number of OFDM symbols occupied by the control information is received via a physical control format indicator channel (PCFICH).

8. The method according to claim 5, wherein the prescribed code is:
(0,1,1,0,1,1,0,1,1,0,1,1,0,1,1,0,1,1,0,1,1,0,1,1,0,1,1,0,1,1, 0,1) when the number of OFDM symbols occupied by the control information is 1,
(1,0,1,1,0,1,1,0,1,1,0,1,1,0,1,1,0,1,1,0,1,1,0,1,1,0,1,1,0,1, 1,0) when the number of OFDM symbols occupied by the control information is 2, and
(1,1,0,1,1,0,1,1,0,1,1,0,1,1,0,1,1,0,1,1,0,1,1,0,1,1,0,1,1,0, 1,1) when the number of OFDM symbols occupied by the control information is 3.

* * * * *